ns Patent [19]

Briefer

[11] 4,434,203
[45] Feb. 28, 1984

[54] DIAPHRAGM
[75] Inventor: Dennis K. Briefer, Berlin, Mass.
[73] Assignee: Setra Systems, Inc., Acton, Mass.
[21] Appl. No.: 200,790
[22] Filed: Oct. 27, 1980
[51] Int. Cl.³ .......................... B32B 3/26; B32B 3/28
[52] U.S. Cl. ................................ 428/152; 179/181 R;
181/157; 181/173; 428/64; 428/174; 428/192;
428/457
[58] Field of Search ............... 428/152, 192, 179, 174,
428/64, 66; 179/181 R; 181/157, 165, 168, 167,
181/173, 174

[56] References Cited
U.S. PATENT DOCUMENTS

| 963,362 | 7/1910 | Edison. | |
|---|---|---|---|
| 1,611,454 | 12/1926 | Joy | 181/173 |
| 1,632,068 | 6/1927 | Harrison | 181/173 |
| 1,859,782 | 5/1932 | May. | |
| 1,990,409 | 2/1935 | Lawrance | 181/164 |
| 3,187,641 | 6/1965 | Bowditch | 92/94 |
| 3,247,927 | 4/1966 | Cragg | 181/168 |
| 3,563,337 | 2/1971 | Kawamura | 181/173 |
| 4,129,195 | 12/1978 | Ishii et al. | 428/64 |

FOREIGN PATENT DOCUMENTS

| 49-14909 | 4/1974 | Japan. |
| 1231109 | 5/1971 | United Kingdom. |
| 1358152 | 6/1974 | United Kingdom. |
| 2003608 | 3/1979 | United Kingdom. |
| 2017919 | 10/1979 | United Kingdom. |
| 2022841 | 12/1979 | United Kingdom. |
| 1573030 | 8/1980 | United Kingdom. |
| 2040474 | 8/1980 | United Kingdom. |
| 2049942 | 12/1980 | United Kingdom. |

Primary Examiner—Paul J. Thibodeau
Attorney, Agent, or Firm—Kenway & Jenny

[57] ABSTRACT

A diaphragm having a pattern of wrinkles adapted so that the diaphragm is both radially and tangentially expandable with respect to a reference point in that central portion.

26 Claims, 15 Drawing Figures

DIAPHRAGM

REFERENCE TO RELATED PATENT APPLICATION

The present application is related to U.S. patent application Ser. No. 200,788, entitled "Capacitive Pressure Sensor", filed on even date herewith, now U.S. Pat. No. 4,358,814 issued Nov. 9, 1982. That application is incorporated by reference herein.

BACKGROUND OF THE DISCLOSURE

The present invention is in the field of transducers, and more particularly, to transducers having a deformable diaphragm sensing element.

There are many forms of prior art transducers which incorporate a diaphragm member as the sensing element. Such sensing elements are also used in linear variable differential transformers (LVDT's) and other forms of motion transducers. In addition, certain forms of prior art strain gages use such diaphragms. In substantially all of these applications, the diaphragm sensing element is generally a relatively smooth, thin deformable member, often stretched between edge-located support points. While such diaphragms are generally effective in their intended uses, they are often the performance-limiting elements in the operation of sensors over temperature ranges, and also in sensitivity for such sensors. To achieve optimal performance, the diaphragm sensing element must be relatively stable dimensionally over temperature as well as provide a uniform sensitivity. In order to provide high sensitivity, the diaphragm must be very sensitive to deforming forces.

Generally, the prior art stretched diaphragms (such as thin sheets of stainless steel on the order of 0.0002 inches thick) are relatively limited in both sensitivity and stability.

Accordingly, it is an object of the present invention to provide an improved diaphragm sensing element for a transducer which is relatively stable while providing high sensitivity.

It is another object to provide an improved diaphragm which includes a portion which is resiliently displaceable along an axis perpendicular to that portion.

SUMMARY OF THE INVENTION

Briefly, the present invention is a diaphragm including a diaphragm member having a pattern of wrinkles whereby the diaphragm is both radially and tangentially expandable with respect to any reference point in its central portion. In one form of the invention, the diaphragm member has a nominally planar portion and a plurality wrinkle portions extending from at least one side of the planar portion. In alternate forms of the invention, the wrinkle portions may extend from both sides of the planar portion. Generally, with this configuration, a dimensionally stable structure is provided with high sensitivity to pressure differentials applied across the structure. For example, with a metallic foil diaphragm in accordance with the present invention, and which is adapted for use in a capacitance transducer, the improvement in sensitivity and stability is on the order of a factor of ten compared with a capacitive transducer using a conventional planar diaphragm having comparable dimensions.

BRIEF DESCRIPTION OF THE DRAWING

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
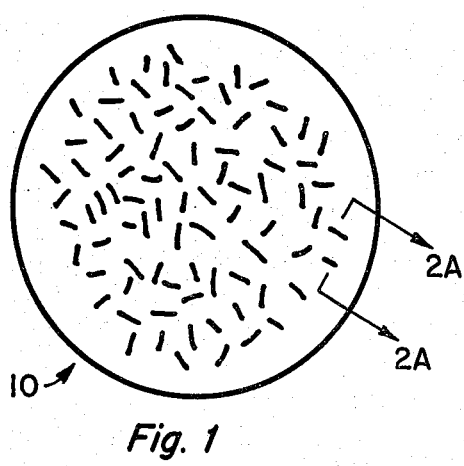
FIG. 1 shows a plan view of an exemplary diaphragm in accordance with the present invention.
Figure 2A:
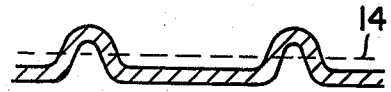
FIG. 2A shows a cross-section of a portion of the diaphragm of FIG. 1.

FIGS. 1 and 2A show a diaphragm element 10 in accordance with the present invention. The diaphragm 10 is a circular metal foil (such as aluminum) having thickness on the order of 0.0002 inches. The foil is substantially planar but includes a plurality of wrinkle portions extending from one side. In FIG. 1, the wrinkled portions are indicated by the short lines. In the illustrated embodiment, the wrinkle portions extend only in a single direction from (i.e. to one side of) the planar portion of the diaphragm. However, in alternative embodiments, some of the wrinkled portions may extend on one side of the diaphragm, while others may extend on the other side.

Figure 2B:
FIG. 2B shows a cross-section of a portion of a diaphragm having a moderately dense wrinkle pattern.
Figure 2C:
FIG. 2C shows a cross-section of a portion of a diaphragm having a relatively dense wrinkle pattern.

It will be understood that in FIG. 1, the wrinkle portions are considered to be perturbations from a nominally planar portion. However, in embodiments having relatively dense wrinkle patterns, the "planar portion" as referred to herein may not be strictly planar, but rather represent the "base" from which extrema of the wrinkle portions extend. In yet other embodiments, the wrinkle distribution may be so dense that the wrinkle portions may just be described as wrinkles, without reference to a base. By way of example, FIG. 2B shows a cross-section of a diaphragm having a moderately dense wrinkle pattern. The broken line 14 is an exemplary reference line which for illustrative purposes separates the "wrinkle portions" (above line 14) from the "planar portions" (below line 14). In this illustration, the portions below line 14, while not strictly planar, are referred to as "planar". As shown in the less dense pattern of FIG. 2A, the "planar portion" (i.e. below line 14) is closer to being strictly planar. FIG. 2C shows a relatively high density wrinkle pattern. In some forms of the invention, the diaphragm may be slightly "domed" so that the wrinkle portions extend from a nominally spherical portion of the diaphragm. However, in such embodiments, the radius of the dome is relatively large compared with the wrinkle dimensions. Accordingly, the spherical portion is considered to fall within the terminology "planar portion" as used herein.

In the construction of FIG. 1, the wrinkled portions in diaphragm 10 are randomly oriented over the surface of the diaphragm. FIG. 2 shows a cross-section of the foil taken through one of the wrinkled portions of the diaphragm 10.

By way of example, in use, the diaphragm 10 may be edge supported under radial tension in a capacitive pressure sensor assembly such as that disclosed in the incorporated reference. In such a sensor, the central portion of the diaphragm 10 may be relatively easily displaced in a direction perpendicular to the plane of the supported edge of diaphragm 10 in response to changes in the pressure differential across the diaphragm. With the structure of the present invention, that displacement of the central portion diaphragm 10 is a highly repeatable function of the pressure differential. Moreover, this repeatability is relatively constant over temperature. Overall, the diaphragm 10 is a factor of ten better in sensitivity and stability (over both time and temperature) compared with a similar thickness planar (conventional) diaphragm.

Each of the wrinkle portions in the diaphragm 10 is straight and extends along an associated principal axis in the plane of the planar portion. In alternative embodiments, at least some of the wrinkled portions may be curved and extend along correspondingly curved reference lines in the plane of the planar element.

The diaphragm 10 of FIG. 1 may be formed by the following sequence of steps. First, a planar elastic member, such as a rubber sheet, is stretched in two perpendicular directions so that the stretched elastic member lies in a plane. Then, a relatively thin metal foil is frictionally coupled to the surface of the stretched elastic member so that the foil lies flat against the stretched elastic member. The foil may be, for example, lightly cemented to the surface of the elastic member, or alternatively, may be held against that stretched elastic member by means of a relatively high gas pressure. The clamping on the elastic member is then released so that that elastic member may return to its unstretched state. As the elastic member returns to that state, the frictional coupling between the foil and that elastic member causes the foil to wrinkle in a low energy pattern so that the foil then has a relatively planar portion and a plurality of wrinkle portions. The foil member is then separated from the diaphragm member (for example, by removing the relatively high air pressure from the side holding it against the diaphragm) and the resultant wrinkled foil may be used as a sensing element for a transducer.

In accordance with a second method of forming a diaphragm according to the invention, a relatively thin metallic foil is positioned in a sandwich configuration between two edge supported planar elastic members (such as rubber sheets) with a pressure $P_1$ outside the sandwich and adjacent to one of the sheets, a pressure $P_2$ between the two sheets, and a pressure $P_3$ outside the sandwich and adjacent to the other sheet. Initially, $P_1$ equals $P_2$ and both $P_1$ and $P_2$ exceed $P_3$. Then the pressures are adjusted so that $P_1$ exceeds $P_2$ which in turn exceeds $P_3$, resulting in a stretching of the sandwich. The pressures are then adjusted so that $P_1$ equals $P_3$ where both $P_1$ and $P_3$ exceed $P_2$. This step returns the sheets to their original unstretched position. As the sheets contract, the frictional contact with the foil (caused by the relatively low pressure $P_2$ during this step, causes the foil to wrinkle. As a final step, the pressures $P_1$, $P_2$, and $P_3$ are equalized, the sheets are separated and the foil diaphragm is removed.

It will be understood that both of the above forming processes result in relatively low energy configurations of the foil. Consequently, the diaphragms of the present invention are well suited for use in capacitive pressure sensors such as those disclosed in the incorporated reference, or other prior art diaphragm capacitance pressure sensors, which utilize edge supported diaphragms based on displacement of the central portions thereof.

In various other embodiments, the diaphragm may be electrically non-conductive, when for example the position of the central portion may be detected optically. In other forms, the diaphragm may be non-conductive, but include a conductive region on one surface, such as may be formed by a deposited conductive film. In the latter form of the invention, a portion of the conductive film extends to the periphery of the diaphragm for permitting electrical contact to external measuring instrumentation. In these and other forms, the present invention provides a "soft" diaphragm which is useful in many devices besides the capacitive sensor described in the incorporated reference. For example, the present invention might be used to replace the conventional diaphragms in certain prior art strain gages and switches. Alternatively, the diaphragm might be used to separate two fluids where it is important that pressure differentials be transmitted across the interfluid boundaries.

Figure 3:
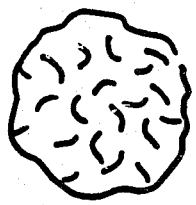
FIGS. 3-13 illustrate alternate embodiments of the present invention.

FIGS. 3-6 show alternate forms for the present invention. In FIG. 3, a portion of a diaphragm similar to diaphragm 10 is shown, wherein the wrinkled portions are curved and extend along correspondingly curved reference line segments in the plane of the planar portion of diaphragm 10.

Figure 4:
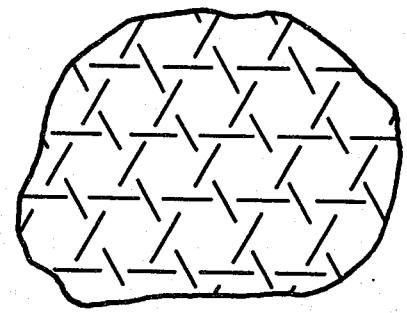

FIG. 4 shows a limited region of a diaphragm having a pattern where straight wrinkle portions are each aligned substantially with one of three axes in the plane of the planar portion, where those axes are 60 degrees offset from each other. This pattern results in a "snowshoe" pattern having a plurality of equilateral triangular and hexagonal portions of the plane pattern defined by the wrinkle portions.

Figure 5:
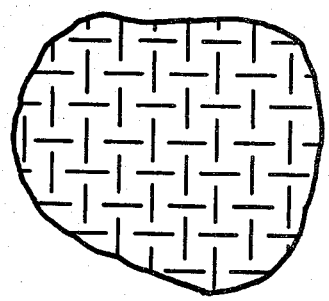

FIG. 5 shows a limited portion of another embodiment of a diaphragm, where the straight wrinkle portions are aligned with one of two axes in the plane of the planar portion, where those two axes are 90 degrees offset from each other. The resultant pattern includes a plurality of square areas in the plane portion as defined by the wrinkle portions.

Figure 6:
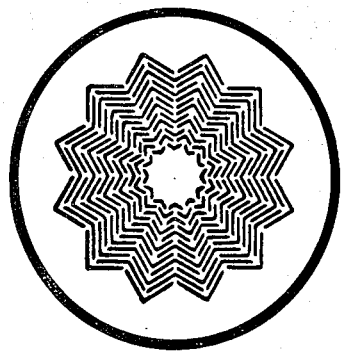

FIG. 6 shows an embodiment of the present invention where the diaphragm includes a plurality of concentric zig-zag ring patterns formed by the wrinkle portions. In the embodiment of FIG. 6, the zig-zag patterns are discontinuous, i.e. each zig-zag ring includes a pair of joined straight line wrinkle segments which are not connected, or joined, to the adjacent pairs in the ring. In other embodiments, even the pairs may be non-connected.

FIGS. 7-13 show plan view embodiments of diaphragms having alternate wrinkle patterns in keeping with the present invention. In all of these figures, the diaphragms are generally denoted by reference numeral 10, and a portion of the periphery of each diaphragm is denoted by reference numeral 12.

The wrinkle pattern of the diaphragms of FIGS. 7-10 generally include concentric zig-zag ring wrinkle portions which are continuous (i.e. each zig-zag ring includes relatively short, straight line wrinkle segments which are connected at their ends to adjacent straight line wrinkle segments). The diaphragms of FIGS. 7 and 10 further include a set of "V" shaped or "chevron" wrinkle portions filling in otherwise blank areas in the pattern.

Figure 7:
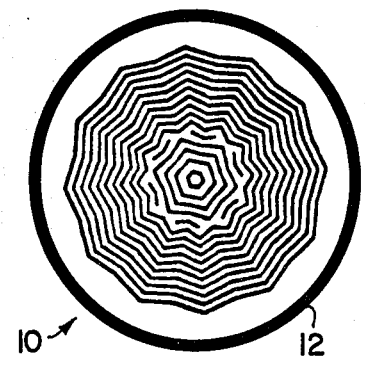
Figure 8:
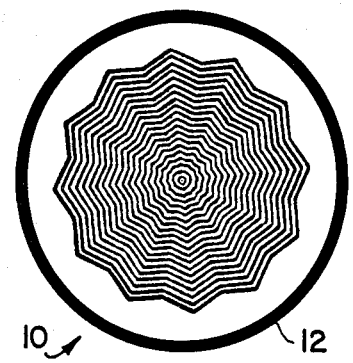
Figure 9:
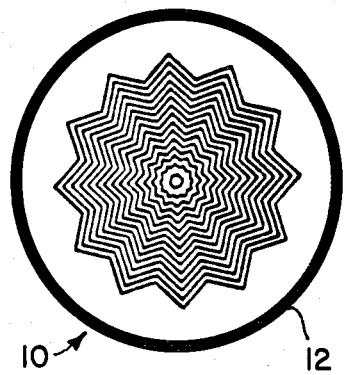
Figure 10:
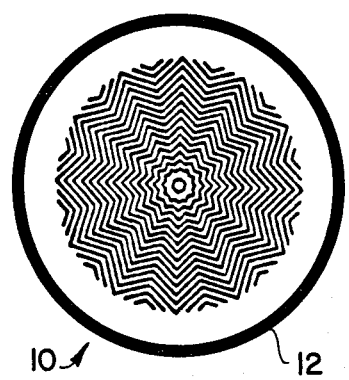
Figure 11:
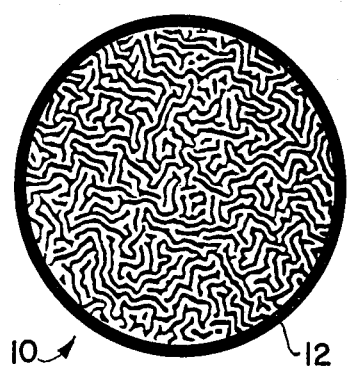

The various rings of the wrinkle pattern of the diaphragm of FIG. 7 are substantially equidistant from adjacent rings, resulting in interior ring angles which increase from ring-to-ring with their radial distance from the diaphragm center. Alternate internal angles of each of the rings of the wrinkle pattern of the diaphragms of FIGS. 8, 9 and 10 are constant (120, 90 and 90 degrees, respectively) from ring to ring regardless of their distance from the center of the diaphragm. In another form, the diaphragm may include a plurality of nested, radially extending zig-zag wrinkle portions. With all of these configurations, any region in the wrinkle pattern of diaphragm 10 is expandable both radially and tangentically with respect to any point on the diaphragm including any point in the central portion of the diaphragm.

Figure 12:
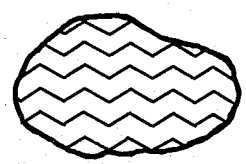
Figure 13:
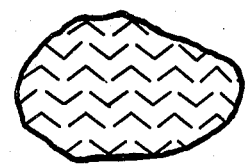

FIGS. 12 and 13 show limited regions of additional embodiments of the invention having wrinkle patterns including linear zig-zag wrinkle portions. In FIG. 12 the wrinkle portions are continuous and in FIG. 13 the wrinkle portions are discontinuous. In the preferred form of the configurations of FIGS. 12 and 13, the angles between the wrinkle peaks (i.e. the black zig-zag lines shown in FIG. 12) are 90 degrees, the angles formed by the trough surfaces between wrinkle peaks are 90 degrees, and the angles formed by the peak surfaces on either side of wrinkle peaks are 90 degrees.

In other embodiments, the wrinkled portions may be aligned along differently oriented axes in keeping with the present invention.

In all the above embodiments, the wrinkle patterns may be generated with a die having a generally planar surface except for perturbations representative of the desired pattern of the wrinkles. Initially, the foil may be placed against that die. Then a high pressure gas used to force the foil into the shape defined by the die. Alternatively, the foil may be forced against the die by a rubber pad driven by the mandrel of a hydraulic press. By way of example, a 1.7 inch diameter sensor element in the form of FIG. 10, made of 0.27 mil 303 stainless steel, may be made with a die with wrinkle pattern groove which have a width of 25 mils and a depth of 5–10 mils, where the grooves are set apart from each other by 25 mils. The center portion of the resultant diaphragm deflects 5 mils for a differential pressure of 0.0015 psi.

In yet other alternative embodiments, various combinations of the above-defined wrinkle patterns may be used together in the same diaphragm. In all forms, however, it is preferred that there be all axes in the nominal plane, or surface, of the diaphragm be traversed by at least one wrinkle portion.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A diaphragm that flexes in a direction generally normal to said diaphragm in response to a pressure differential across the diaphragm, comprising: a generally thin diaphragm member formed of a structural material that is substantially inelastic, said diaphragm member including a low energy collapse pattern of wrinkles that extend over a substantial portion of the diaphragm, each of said wrinkles being elongated over a short length in any one direction and having an amplitude greater than the thickness of the diaphragm but not projecting substantially from the plane of said diaphragm, said low energy collapse pattern also being such that the angular orientation of said elongated wrinkles varies over said diaphragm member and any axis lying in the plane of said diaphragm intersects at least one wrinkle to thereby relieve stresses induced in said diaphragm member by said pressure differential, whereby said diaphragm is both radially and tangentially expandable with respect to any reference point in the central portion thereof.

2. A diaphragm according to claim 1 wherein said central portion has an electrically conductive surface and wherein said conductive surface extends to the periphery of said diaphragm.

3. A diaphragm according to claim 1 wherein said diaphragm member includes a peripheral region adapted for supporting said diaphragm so that said central portion is substantially planar.

4. A diaphragm according to claim 1 wherein said wrinkle pattern of diaphragm includes a nominally planar portion and a plurality of wrinkle portions extending from at least one side of said planar portion.

5. A diaphragm according to claim 4 wherein said wrinkle portions extend from both sides of said planar portion.

6. A diaphragm according to claim 1 wherein the principal axes of said wrinkles are aligned substantially with one of three axes on the surface of said central portion, said axes being sixty degrees offset from each other.

7. A diaphragm according to claim 1 wherein the principal axes of said wrinkles are aligned substantially with one of two axes on the surface of the said central portion, said axes being ninety degrees offset from each other.

8. A diaphragm that flexes in a direction generally normal to said diaphragm in respnse to a pressure differential across the diaphragm, comprising: a generally thin diaphragm member formed of a structural material that is substantially inelastic, said diaphragm member including a low energy collapse pattern of wrinkles that extend over a substantial portion of the diaphragm, each of said wrinkles being elongated over a short length in any one direction and having an amplitude greater than the thickness of the diaphragm but not projecting substantially from the plane of said diaphragm, said low energy collapse pattern being such that the angular orientation of said elongated wrinkles varies over said diaphragm member in a random manner and any axis lying in the plane of said diaphragm intersects at least one wrinkle to thereby relieve stresses induced in said diaphragm member by said pressure differential, whereby said diaphragm is both radially and tangentially expandable with respect to any reference point in the central portion thereof.

9. The diaphragm of claim 8 wherein said wrinkles are discontinuous.

10. The diaphragm according to claim 9 wherein said wrinkles are straight.

11. The diaphragm according to claim 9 wherein said wrinkles are each curved.

12. The diaphragm according to claim 11 wherein some of said wrinkles are continuous.

13. A diaphragm that flexes in a direction generally normal to said diaphragm in response to a pressure differential across the diaphragm, comprising: a generally thin diaphragm member formed of a structural material that is substantially inelastic, said diaphragm member including a low energy collapse pattern of wrinkles that extend over a substantial portion of the diaphragm, each of said wrinkles being elongated over a short length in any one direction, straight and discontinuous, and having an amplitude greater than the thickness of the diaphragm but not projecting substantially from the plane of said diaphragm, said low energy collapse pattern being such that the angular orientation of said elongated wrinkles varies over said diaphragm member with the principal axes of said wrinkles being aligned generally with one of a plurality axes in the plane of said diaphragm such that any axis lying in the plane intersects at least one wrinkle to thereby relieve stresses induced in said diaphragm member by said pressure differential, whereby said diaphragm is both radially and tangentially expandable with respect to any reference point in the central portion thereof.

14. The diaphragm of claim 13 wherein said plurality is three and said axes are offset from one another by sixty degrees.

15. The diaphragm of claim 13 wherein said plurality is two and said axes are offset from one another by ninety degrees.

16. A diaphragm that flexes in a direction generally normal to said diaphragm in response to a pressure differential across the diaphragm, comprising: a generally thin diaphragm member formed of a structural material that is substantially inelastic, said diaphragm member including a low energy collapse pattern of wrinkles that extend over a substantial portion of the diaphragm, each of said wrinkles being elongated over a short length in any one direction and having an amplitude greater than the thickness of the diaphragm but not projecting substantially from the plane of said diaphragm, said low energy collapse pattern being such that the angular orientation of said elongated wrinkles varies over said diaphragm member in a plurality of concentric zig-zag ring patterns where each of said wrinkles is a short, straight portion of one of said rings such that any axis lying in the plane of said diaphragm intersects at least one wrinkle to thereby relieve stresses induced in said diaphragm member by said pressure differential, whereby said diaphragm is both radially and tangentially expandable with respect to any reference point in the central portion thereof.

17. The diaphragm according to claim 16 wherein each of said rings of wrinkles is continuous.

18. The diaphragm according to claim 16 wherein at least some of said ring patterns are formed of wrinkles that are discontinuous.

19. The diaphragm according to claim 17 wherein interior angles of each of said ring patterns are 90 degrees.

20. The diaphragm according to claim 17 wherein interior angles of each of said ring patterns are 120 degrees.

21. The diaphragm according to claim 17 wherein inter-ring pattern separation is substantially constant.

22. A diaphragm that flexes in a direction generally normal to said diaphragm in response to a pressure differential across the diaphragm, comprising: a generally thin diaphragm member formed of a structural material that is substantially inelastic, said diaphragm member including a low energy collapse pattern of wrinkles that extend over a substantial portion of the diaphragm, each of said wrinkles being elongated over a short length in any one direction, straight and having an amplitude greater than the thickness of the diaphragm but not projecting substantially from the plane of said diaphragm, said low energy collapse pattern being such that the angular orientation of said elongated wrinkles varies over said diaphragm member with the principal axes of said wrinkles being aligned generally with one of a plurality axes in the plane of said diaphragm such that any axis lying in the plane intersects at least one wrinkle to thereby relieve stresses induced in said diaphragm member by said pressure differential, whereby said diaphragm is both radially and tangentially expandable with respect to any reference point in the central portion thereof.

23. The diaphragm according to claim 22 wherein groups of said wrinkle are linear to form a wrinkle pattern that is a plurality of linear zig-zag patterns.

24. The diaphragm according to claim 23 wherein said linear zig-zag patterns are substantially parallel.

25. The diaphragm according to claim 23 wherein said linear zig-zag patterns are continuous.

26. The diaphragm according to claim 23 wherein said linear zig-zag patterns are discontinuous.

* * * * *